United States Patent
Bartolotta et al.

(10) Patent No.: US 11,443,067 B2
(45) Date of Patent: Sep. 13, 2022

(54) RESTRICTING ACCESS AND EDIT PERMISSIONS OF METADATA

(71) Applicant: salesforce.com, inc., San Francisco, CA (US)

(72) Inventors: Jeffrey Michael Bartolotta, Concord, CA (US); Avrom Irwin Roy-Faderman, San Francisco, CA (US); James B. Wunderlich, Burlingame, CA (US); Dileep Burki, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 804 days.

(21) Appl. No.: 15/885,692

(22) Filed: Jan. 31, 2018

(65) Prior Publication Data

US 2019/0236292 A1    Aug. 1, 2019

(51) Int. Cl.
| | |
|---|---|
| *G06F 21/62* | (2013.01) |
| *G06F 16/176* | (2019.01) |
| *G06F 8/30* | (2018.01) |
| *G06F 8/65* | (2018.01) |

(52) U.S. Cl.
CPC .............. *G06F 21/629* (2013.01); *G06F 8/30* (2013.01); *G06F 8/65* (2013.01); *G06F 16/1774* (2019.01)

(58) Field of Classification Search
None
See application file for complete search history.

(56) References Cited

U.S. PATENT DOCUMENTS

| | | |
|---|---|---|
| 5,325,533 A | 6/1994 | McInerney et al. |
| 5,499,357 A | 3/1996 | Sonty et al. |
| 5,805,899 A | 9/1998 | Evans et al. |
| 7,596,777 B2 | 9/2009 | Fallen-Bailey et al. |
| 8,245,219 B2 | 8/2012 | Agarwal et al. |
| 8,285,876 B2 | 10/2012 | Chua |
| 8,510,729 B2 | 8/2013 | Weissman et al. |

(Continued)

OTHER PUBLICATIONS

R.S. Thompson et al., "APEX: Use of JAVA and XML in Automated Procedure Execution," [Online], 2004, pp. 1-10, [Retrieved from Internet on Nov. 25, 2019], <https://arc.aiaa.org/doi/pdf/10.2514/6.2004-404-232>.

(Continued)

*Primary Examiner* — Philip Wang
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to installing and operating applications in a server-based application workspace. A computer system, while operating the server-based application workspace, may store subscription information indicating a user that is a developer for a particular application package, and one or more users that are subscribers for the particular application package. The computer system may further store lock data for the particular application package that indicates user permissions to edit at least one application component for the particular application package. Based on the lock data, the computer system may permit the developer to edit the at least one application component of the particular application package, and deny requests from the one or more users to edit the at least one application component.

20 Claims, 10 Drawing Sheets

(56) References Cited

U.S. PATENT DOCUMENTS

| | | | |
|---|---|---|---|
| 8,578,363 B2 | 11/2013 | Sah et al. | |
| 8,589,897 B2 | 11/2013 | Myles et al. | |
| 8,701,103 B1 | 4/2014 | Hsu et al. | |
| 8,887,149 B2 | 11/2014 | Rogers et al. | |
| 8,924,950 B2 | 12/2014 | McDonald et al. | |
| 2002/0066075 A1 | 5/2002 | Mowers et al. | |
| 2002/0100036 A1 | 7/2002 | Moshir et al. | |
| 2004/0019799 A1* | 1/2004 | Vering | G06F 21/6218 726/1 |
| 2004/0098384 A1 | 5/2004 | Min et al. | |
| 2005/0097301 A1 | 5/2005 | Ben-David et al. | |
| 2006/0026568 A1 | 2/2006 | Wiltamuth et al. | |
| 2006/0089932 A1* | 4/2006 | Buehler | G06F 21/6218 |
| 2007/0113187 A1* | 5/2007 | McMullen | G06F 21/6218 715/742 |
| 2008/0086482 A1* | 4/2008 | Weissman | G06F 21/6218 |
| 2008/0162604 A1 | 7/2008 | Soulet et al. | |
| 2008/0189693 A1* | 8/2008 | Pathak | H04L 67/125 717/168 |
| 2009/0006402 A1* | 1/2009 | Bohle | G06F 16/289 |
| 2009/0119304 A1 | 5/2009 | Preslan et al. | |
| 2009/0150414 A1 | 6/2009 | Mcclanahan et al. | |
| 2010/0023519 A1* | 1/2010 | Kailash | H04L 63/10 707/E17.007 |
| 2010/0058197 A1* | 3/2010 | Chee | G06F 21/6218 715/751 |
| 2010/0095373 A1* | 4/2010 | Levenshteyn | G06F 21/62 726/21 |
| 2010/0169876 A1* | 7/2010 | Mann | G06F 8/65 717/170 |
| 2010/0299663 A1 | 11/2010 | Weissman et al. | |
| 2013/0232246 A1 | 9/2013 | Miller et al. | |
| 2013/0263083 A1 | 10/2013 | Reddy et al. | |
| 2014/0122679 A1 | 5/2014 | Griffin | |
| 2014/0173579 A1 | 6/2014 | McDonald et al. | |
| 2014/0358868 A1 | 12/2014 | Costecalde et al. | |
| 2015/0169386 A1 | 6/2015 | Gopalraj et al. | |
| 2016/0092343 A1 | 3/2016 | Chhatwal et al. | |
| 2016/0266896 A1* | 9/2016 | Fan | G06F 8/33 |
| 2016/0335079 A1 | 11/2016 | Tammam et al. | |
| 2016/0352746 A1* | 12/2016 | Anderson | G06F 8/70 |
| 2017/0123790 A1* | 5/2017 | Gupta | G06F 11/3604 |
| 2017/0147324 A1 | 5/2017 | Weber et al. | |
| 2018/0260193 A1* | 9/2018 | Polisky | G06F 8/70 |
| 2019/0005722 A1 | 1/2019 | Murching et al. | |

OTHER PUBLICATIONS

Liam Fallon et al., "Apex: An Engine for Dynamic Adaptive Policy Execution," [Online], 2016, pp. 699-702, [Retrieved from Internet on Nov. 25, 2019], <https://ieeexplore.ieee.org/stamp/stamp.jsp?arnumber=7502880>.

Andreas Hueni et al., "Structure, Components, and Interfaces of the Airborne Prism Experiment (APEX) Processing and Archiving Facility," [Online], 2009, pp. 29-43, [Retrieved from Internet on Nov. 25, 2019], <https://ieeexplore.ieee.org/stamp/stamp.jsp?arnumber=4694063>.

Saeed Iqbal et al., "Extending Java Pathfinder (JPF) with Property Classes for Verification of Android Permission Extension Framework," [Online], 2013, pp. 15-20, [Retrieved from Internet on Nov. 25, 2019], <https://ieeexplore.ieee.org/stamp/stamp.jsp?arnumber=6650135>.

* cited by examiner

RESTRICTING ACCESS AND EDIT PERMISSIONS OF METADATA

BACKGROUND

Technical Field

Embodiments described herein are related to the field of web-based computing systems, and more particularly to the implementation of permissions for application components.

Description of the Related Art

Cloud application development platforms, such as the Force.com multitenant architecture, may allow individual enterprises and software as a service (SaaS) vendors to develop robust, reliable, and Internet-scale applications. Such Internet or web-based applications may include or link to one or more application components that include code, data, metadata or a combination thereof. Web applications may access various types of data, e.g., by accessing a database and processing accessed information. These web applications may include multiple instances of application components utilized during application execution. Various rules or permissions may be established to indicate an application's capability to access and modify these component instances.

Figure 1:
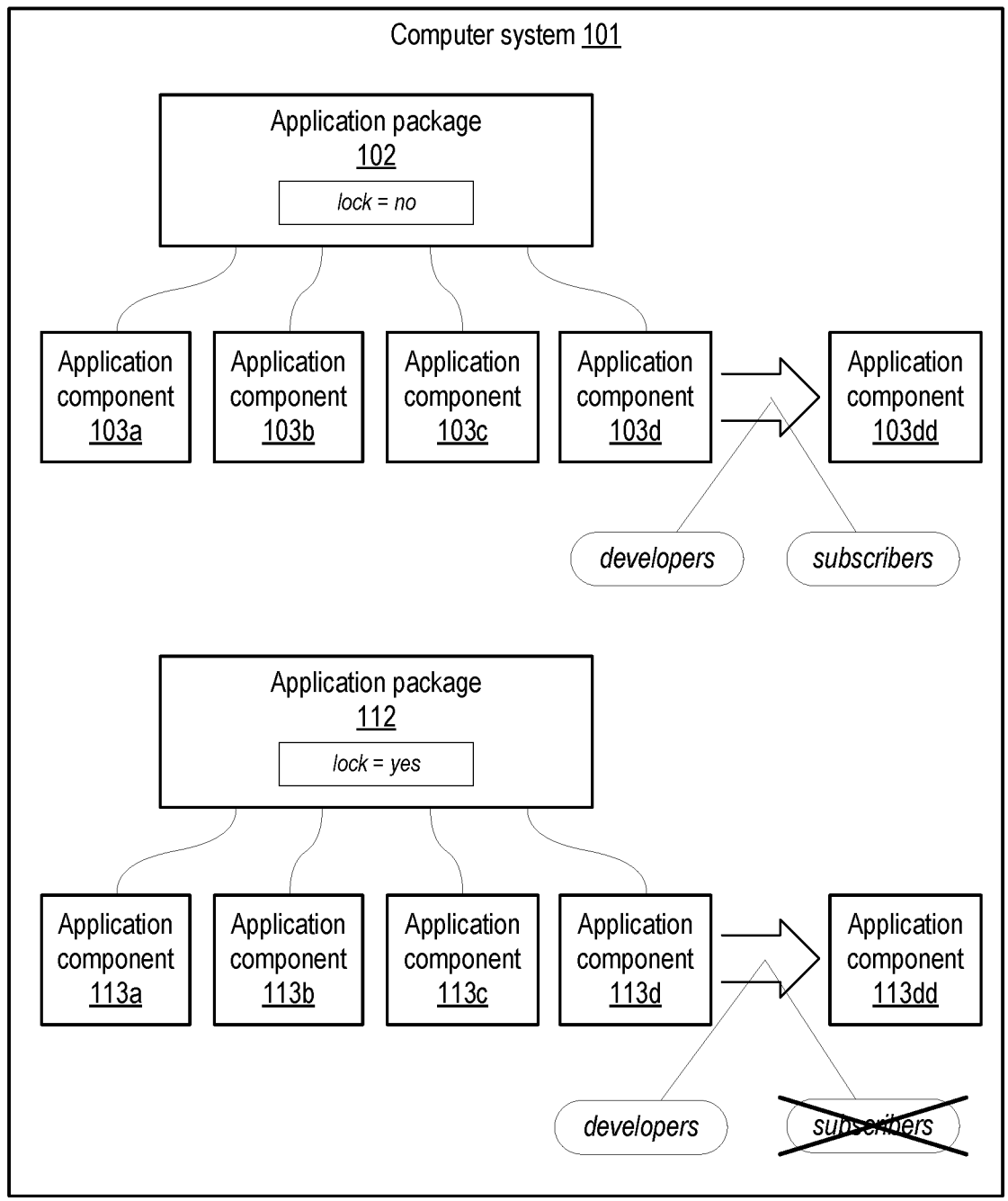
FIG. 1 illustrates a block diagram for an embodiment of a computer system, including two installed application packages.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "processing element configured to store manageable state information" is intended to cover, for example, an element that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Application components, including metadata objects, may be used by, generated by, and modified by one or more computer applications executing in a server-based application workspace or framework. These applications may utilize application components while performing any number of tasks. As used herein, application "components" refers to any part of an application or application package, including executable code, data to be used by executable code, and metadata that provides information about code or data in an application package. An "application package" thus refers to or specifies one or more application components that are utilized during execution of an application (i.e., during runtime). Application components, in some embodiments, may include information specifying permissions that determine how they may be accessed and used by other application components in an application package or components from other application packages. Improper usage of particular application components may result in improper and/or unexpected operation of an application.

During execution of an application, application components may be accessed, and in some cases, executed or cause an execution of program instructions that may, in turn, access other application components. For example, in one embodiment, a first application may be used to access a secure database managed by a second application. As part of the authentication process, a particular application component of the first application may be accessed by a second application package. Providing a protection mechanism for other application components of the first application may prevent the second application from accessing components other than the particular component, thereby securing information in the other components.

In another example, a particular application may be used by two different organizations. The first organization may require strict control over the application components to prevent unauthorized changes due to an auditing or compliance process that prohibits deviations from the released application or changes to the application during a particular time period, e.g., during a product testing phase. In contrast, the second organization may desire their users of the particular application to have the flexibility to modify application components to meet the user's needs, such as, a salesperson modifying content and/or formats of the particular application's output to match a particular customer's business needs. In various embodiments described herein, disclosed techniques may enable an application developer to establish various application component rules and permissions that provide sufficient protection of components while allowing adequate flexibility for users.

A block diagram for two computer systems is illustrated in FIG. 1. Computer system 101 includes installed application packages 102 and 112. Application package 102 utilizes application components 103a-103d. Application component 103dd corresponds to an edited version of application component 103d. Similarly, application package 112 utilizes application components 113a-113d, application component 113dd corresponding to an edited version of application component 113d.

Computer system 101 is any suitable type of computer system onto which applications and their components may be installed. In the illustrated embodiment, computer system 101 corresponds to an Internet-connected system of one or more server computers capable of hosting server-based application workspaces for multiple tenants, such as, for example, the Force.com multitenant architecture, or other software as a service (SaaS) platforms. As used herein, an "application workspace" refers to a portion of resources of computer system 101 that are allotted to a particular application during runtime of that application. A "server-based application workspace" means that this workspace is hosted on one or more server computer systems. These server computer systems may be connected to the Internet in various embodiments, and may be implemented, for example, using cloud computing techniques. A server-based application workspace may thus provide a platform that permits developers the ability to develop, test, and release, applications, and subscribers the ability to utilize and, in some cases, further refine these applications. Thus, a subscriber to services hosted by computer system 101 may install application packages 102 and 112. In some embodiments, installation of application packages 102 and 112 may include storage of program instructions, data, and metadata related to each application package onto a computer system local to the subscriber. In the illustrated embodiment, the installation process includes storage of program instructions, data, and metadata related to application packages 102 and 112 into a program workspace allocated to the subscriber and maintained as a part of computer system 101.

Application package 102, in the illustrated embodiment, includes one or more files that include program instructions, data, or metadata associated with an application. As previously explained, an "application package" (or simply a "package") includes components that are to be used in an application. Some platforms may describe the components of an application packages as a collection of metadata components. Examples of application components that may be found in an application package thus include, without limitation, code (e.g., Apex, JavaScript, etc. or formulas) and files (e.g., Word documents or other file types), and other data objects. In some embodiments, a developer can thus define an application package that includes all setup data (e.g., custom object definitions, page layout definitions, workflow rules, etc.) that make up an application. As shown, application package 102 specifies four application components, 103a-103d. Application components 103a-103d may be installed as a part of application package 102.

As part of the installation process, computer system 101, in the illustrated embodiment, may store subscription information indicating a user that is a developer for application package 102, and further identify one or more users that are subscribers for the particular application package. As used herein, a "subscriber" refers to a user of one or more application packages, that has no additional privileges beyond other users. A "developer," as used herein, refers to a particular entity that creates and supports an application package that is used by subscribers, and may, therefore, have a higher level of permissions for an application package than a subscriber. In some embodiments, the developer may belong to a different organization than the subscribers, e.g., the developer belongs to a third party vendor that supplies an application package to the subscriber's organization. In other embodiments, the developer may belong to the same organization as the subscribers, e.g., as part of an information technology (IT) group within the subscriber's organization. The term "developer" is thus used herein with respect to a particular application to denote a role that is distinct from a "subscriber"; this role may be used to differentiate permissions between different users of a platform with respect to the particular application.

In some cases, the developer may want to prevent the users from making changes to the application components of a given application package, but still allow the develop to make a change to, e.g., fix a bug or add a feature. In other cases, the developer may allow the subscribers to make changes, for example, to modify a format of output of an application package. To selectively allow or prevent changes by subscribers, the developer may cause computer system 101 to store a value corresponding to lock data for application package 102 that indicates user permissions to edit application components 103a-103d. As shown in FIG. 1, application package 102 has lock data set to "no," indicating that both the developer and the one or more subscribers are permitted to edit application components 103a-103d. In the illustrated embodiment, either the developer or the subscribers may edit application component 103d to generate edited application component 103dd. If, however, computer system 101 detects a conflict between a subscriber edit and a developer edit to application component 103d, then computer system 101 may overwrite the subscriber edit with the developer edit.

Similarly, computer system 101 may store subscription information indicating a user that is a developer, and one or more users that are subscribers for application package 112. Computer system 101 also stores a value for the lock data for application package 112. As shown in FIG. 1, application package 112 has lock data set to "yes," indicating that only the developer is permitted to edit application components 103a-113d. In the illustrated embodiment, only the developer may edit application component 113d to generate edited application component 113dd. Computer system 101 denies requests from the one or more subscribers to edit application component 113d, as well as application components 113a-113c.

In the illustrated embodiment, a single lock data value is used to lock or unlock all application components associated with a particular application package. In other embodiments, however, multiple lock data values may be used to independently lock or unlock any suitable subset of application components for a particular application component. It is contemplated that a given embodiment may include a respective lock data value for each application component in a particular application package.

It is noted that the embodiment of FIG. 1 is merely an example for demonstrating concepts disclosed herein. In other embodiments, any suitable number of application packages may be installed and each package may include any suitable number of application components.

Figure 2:
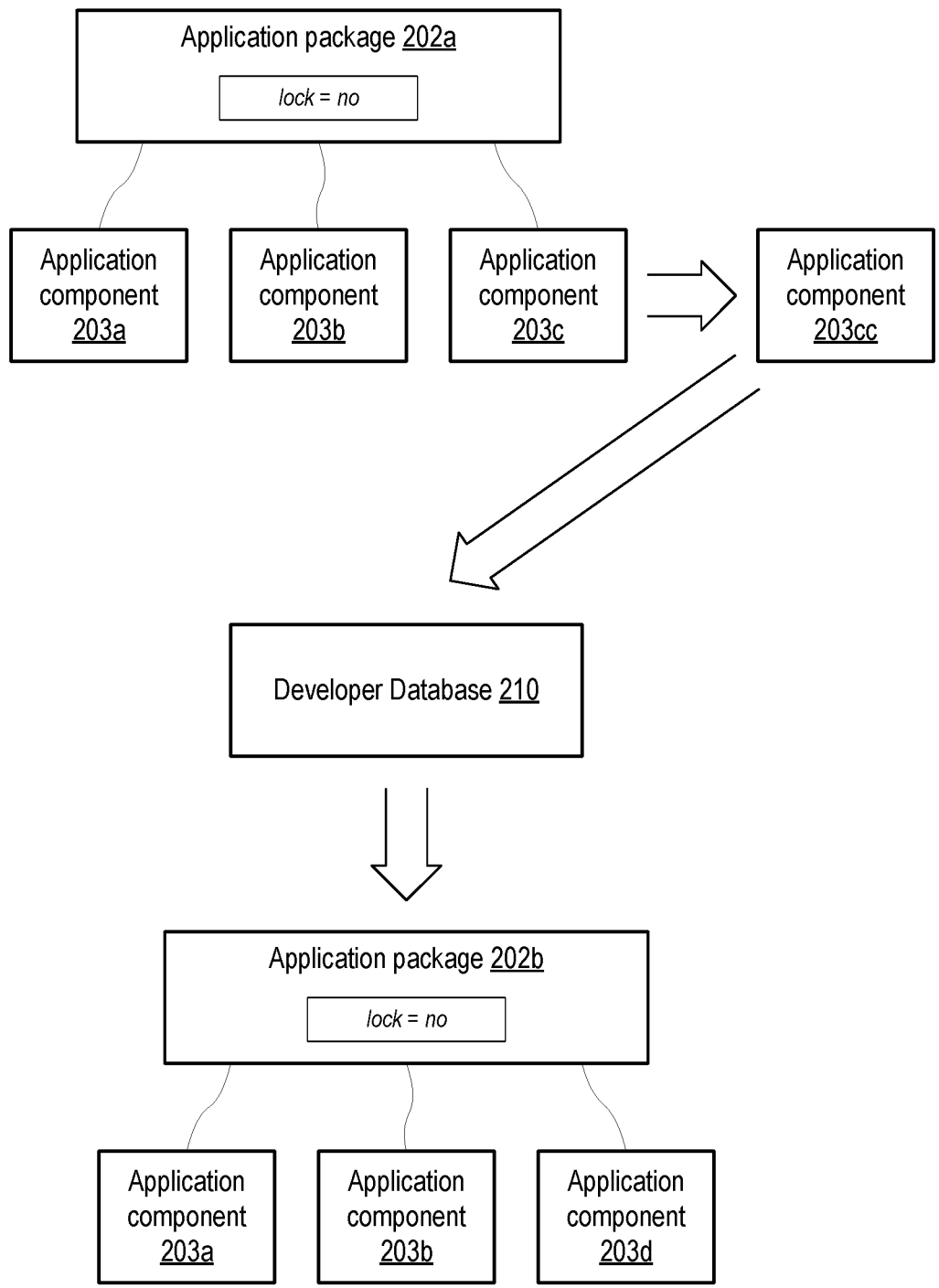
FIG. 2 shows a block diagram for upgrading an embodiment of an application package using feedback from user edits.

Moving to FIG. 2, an embodiment is shown that illustrates a process for providing feedback regarding edits made to an installed application component. Application package 202a is shown with application components 203a-203c. Application component 203cc represents an edited version of application component 203c. Developer database 210 receives information about application component 203cc which may be used to generate application package 202b, an upgrade to application package 202a, with application components 203a, 203b, and 203d.

Application package 202a is installed in an application workspace on a computer system such as, for example, computer system 101 of FIG. 1. Lock data for application package 202a indicates that application components 203a-203c may be edited by a developer or subscribers authorized to execute application package 202a. At some point in time after installation, application component 203c is edited, thereby generating application component 203cc. Information regarding the edits of application component 203cc are sent to developer database 210. Developer database 210 corresponds, in the illustrated embodiment, to any suitable repository for collecting and storing information related to edits to application modules supported by a particular application developer. Developer database 210 may, in some embodiments, be implemented as a part of a computer system 101.

Edit information may be sent to developer database 210 using a variety of techniques. For example, in one embodiment, edits may be identified and relevant information regarding the edits sent upon saving application component 203cc. In other embodiments, the edits may be sent in response to a release of application component 203cc to the application workspace. In some embodiments, a background process operating in the application workspace may periodically scan installed application processes to identify new edits and send the newly identified edits to developer database 210.

A developer for application component 203c may review the edit information stored in developer database 210. The review of the edit information may occur in response to receiving new edit information in developer database 210 or in response to preparing other edits for an upgrade to application package 202b. The developer generates application package 202b as an upgrade to application package 202a, with application component 203d replacing application component 203c. The developer may or may not select to incorporate changes into application component 203d based on the edit information available in developer database 210.

After application package 202b has been generated, the developer may install the upgraded package, thereby replacing application package 202a with application package 202b. Application components 203a and 203b remain unchanged, but application component 203d replaces the edited application component 203cc. Any edits included in application component 203cc are overwritten by the content of application component 203d. In some embodiments, the lock data of application package 202b may remain the same as it was in application package 202a, as is shown in FIG. 2. In other embodiments, the lock data may selectively be changed to a new value to, for example, prevent further edits by subscribers.

It is noted that the embodiment of FIG. 2 is one example. In other embodiments, a different number of application components may be edited. Similarly, in some embodiments, a different number of application components may be upgraded.

Figure 3:
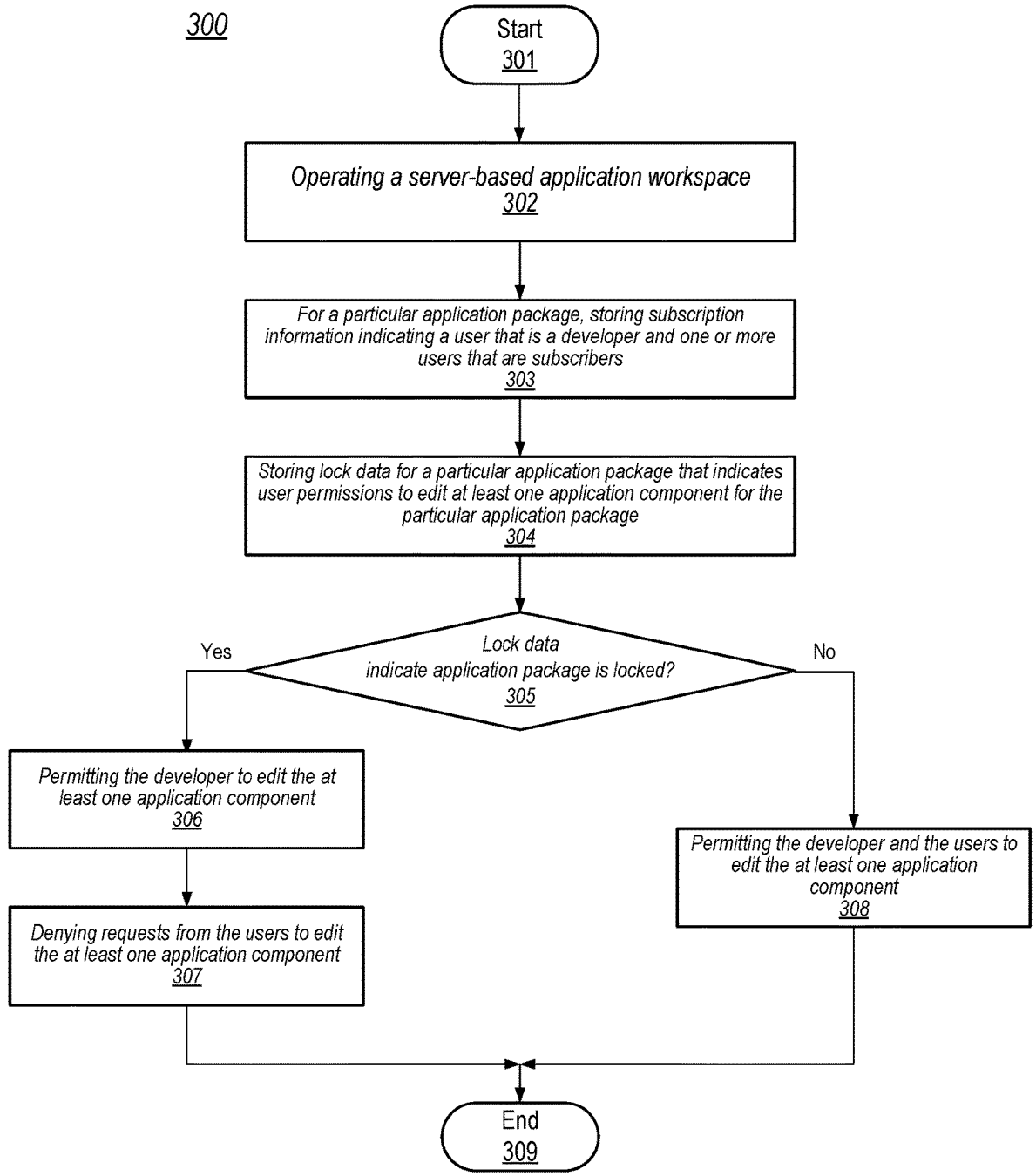
FIG. 3 depicts a flow diagram of an embodiment of a method for installing an application package and applying lock data to usage of the package.

Turning to FIG. 3, an embodiment of a method for installing an application package, including lock data, is depicted. Method 300 may be performed by a computer system, such as, for example, computer system 101 in FIG. 1. Referring collectively to FIG. 1 and method 300 in FIG. 3, the method begins in block 301.

A computer system operates a server-based application workspace (block 302). In the illustrated embodiment, computer system 101 corresponds to an Internet connected system of one or more server computers capable of hosting a server-based application workspace for multiple tenants. The application workspace may correspond to a portion of resources, e.g., memory and processor cores, of computer system 101 that are allotted to a particular application during runtime of that application.

The computer system stores subscription information indicating a user that is a developer for a particular application package, and one or more users that are subscribers for the particular application package (block 303). During an installation process of application packages 102 and 112, computer system 101 identifies a particular user or entity as a developer for the respective packages, thereby providing the identified user with certain editing capabilities. In some embodiments, other users of application packages 102 and 112 may be identified and assigned as subscribers of application packages 102 and 112. If application package 102 and 112 are installed into a same application workspace, then the developer and subscribers may be the same for both packages. In other embodiments, however, different users may be identified as the respective developer for each package.

The computer system stores lock data for the particular application package that indicates user permissions to edit at least one application component for the particular application package (block 304). In addition to identifying a developer and one or more subscribers for each of application packages 102 and 112, lock data is stored for each respective package. A value for the lock data may be selected by the identified developer, or may be predetermined based on respective subscriber contracts submitted upon gaining usage privileges to each of application packages 102 and 112.

Further operations may depend on lock data associated with the particular application package (block 305). In the illustrated embodiment, lock data may have one of two values: "yes" the corresponding application package is locked, or "no" the corresponding package is not locked. In other embodiments, additional values may be include to provide multiple levels of application locking or to provide lock protection to more than two classifications of users. If a particular application package is locked, then the method moves to block 306 to enforce the locked permissions. Otherwise, the method moves to block 308 in which editing of application components is permitted.

If the lock data indicates that the particular application package is locked, then the computer system permits the developer to edit the at least one application component of the particular application package (block 306). Referring to locked application package 112, computer system 101 may allow a user identified as a developer for application package 112 to edit application component 113*d*. The developer, for example, may edit application component 113*d* to fix a bug, or to modify a format of data output from application package 112, thereby generating application component 113*dd* as an edited version of application component 113*d*.

The computer system denies requests from the one or more users to edit the at least one application component (block 307). If a user limited to subscriber permissions attempts to edit application component, computer system 101 denies the request to edit. Such a denial may include denying the subscriber from opening a file associated with the locked application component. In other embodiments, the subscriber may be allowed to open a file associated with the application component, but be denied the ability to make and/or save any edits. A subscriber, therefore, is prevented from generated application component 113*dd*. The method ends in block 309.

If the lock data indicates that the particular application package is not locked, then the computer system permits the developer and the users to edit the at least one application component (block 308). Referring to unlocked application package 102, computer system 101 may allow a user identified as a developer, as well as a user identified as a subscriber, for application package 112 to edit application component 113*d*. Either the developer or a subscriber may edit application component 103*d*, thereby generating application component 103*dd* as an edited version of application component 103*d*. It is noted that if both a developer and a subscriber make edits to an application component, then, in the illustrated embodiment, the subscriber's edits are overwritten by the developer's edits. The method ends in block 309.

It is also noted that the method of FIG. 3 is an example embodiment. In other embodiments, additional operations may be included. Although some operations are illustrated as occurring in series, they may be performed in a different order, including in parallel. For example, operations in blocks 306 and 307 may occur in parallel if edit requests are received from a developer and a subscriber at a same time.

Figure 4:
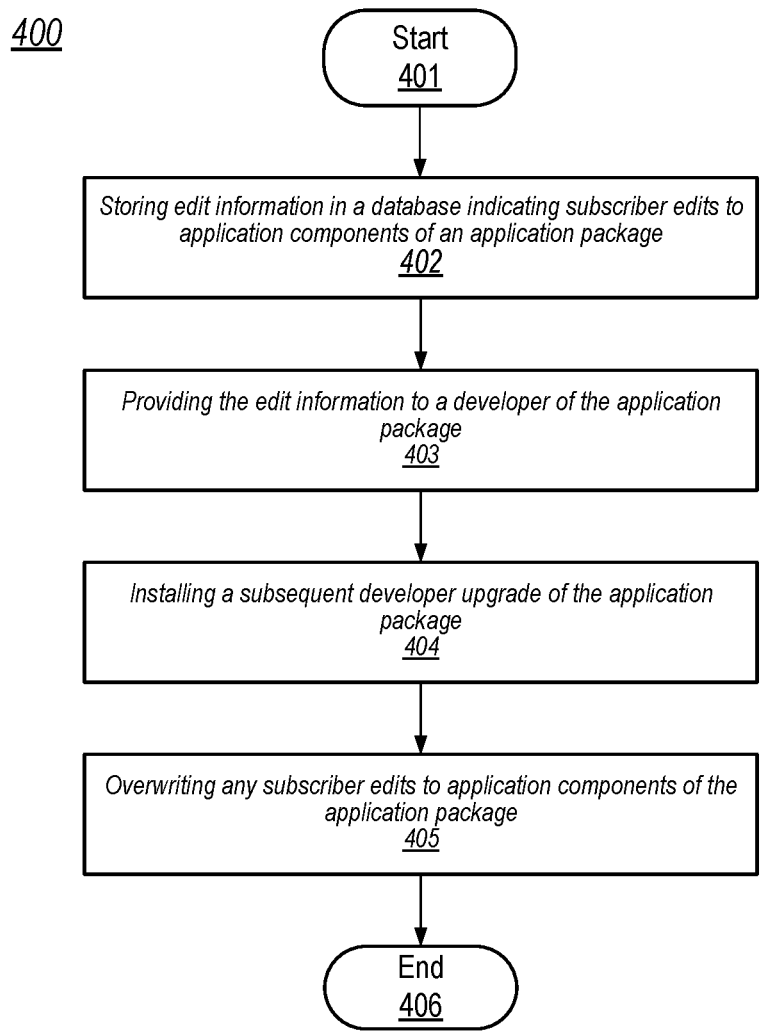
FIG. 4 illustrates a flow diagram of an embodiment of a method for providing feedback regarding edits to an application package.

Moving now to FIG. 4, a flow diagram representing an embodiment of a method for providing edit information to a developer of a an application package is shown. The operations of method 400 may be applied to a computer system, such as computer system 101 in FIG. 1, for example. The operations may provide a method for providing feedback regarding edits made to one or more application components, such as, e.g., application components 203*a*-203*c* of application package 202*a* in FIG. 2. Referring collectively to FIGS. 1, 2, and 4, method 400 may begin in block 401.

A computer system stores, in a database, edit information indicating subscriber edits to application components of an application package (block 402). In the illustrated embodiment, application package 202*a* is installed in an application workspace on computer system 101. A user with appropriate permission, edits application component 203*c*, generating edited application component 203*cc*. Information related to the edits of application component 203*cc* is sent to developer database 210 where it is stored. The edit information may be sent by any suitable method. For example, in one embodiment, a software process runs on computer system 101 and periodically scans application components for installed application packages to detect a modification to one or more application components. Such a process may cause computer system 101 to detect an edit date of a file associated with application component 203*cc* and determine that the component has been edited since a last scan was performed. In response to detecting the edited file, computer system 101 may then compare the edited file to a previously stored version of the file to determine the changes. these changes may then be put into a file that is copied into developer database 210. Other methods of storing the edit information are also contemplated.

The computer system provides the edit information to a developer of the application package (block 403). A developer of application package 202*a* may access the edit information stored in developer database 210. In some embodiments, the developer may receive an indication that application component 203*c* has been edited. Such indications may include an email, a text message, an alert in a software development environment, or the like. In other embodiments, the developer may check developer database 210 at certain points in time, such as, for example, when planning other updates to application component 203*c* or other components associated with application package 202*a*. The developer may review edit data associated with application component 203*c* and generate an upgrade, e.g., application component 203*d*.

The computer system installs a developer upgrade of the application package (block 404). The developer, after generating the upgraded application component 203*d*, provides an upgraded application package 202*b* for installation on computer system 101. Computer system 101 may then copy new files associated with the upgraded application package 202*b* into the application workspace.

The computer system overwrites subscriber edits to application components of the different application package (block 405). As part of the installation of the upgraded application package 202*b* into the application workspace on computer system 101, edited application component 203*cc* is replaced with upgraded application component 203*d*. In some embodiments, application component 203*cc* may be removed. In other embodiments, however, application component 203*cc* may remain, but application package 202*b* specifies application component 203*d*, rather than application component 203*cc*. The method ends in block 406.

It is noted that method 400 of FIG. 4 is one embodiment for describing the disclosed concepts. Although some operations are illustrated as occurring in series, in some embodiments they may be performed in a different order, including in parallel. In some embodiments, a different number of operations may be included.

Figure 5:
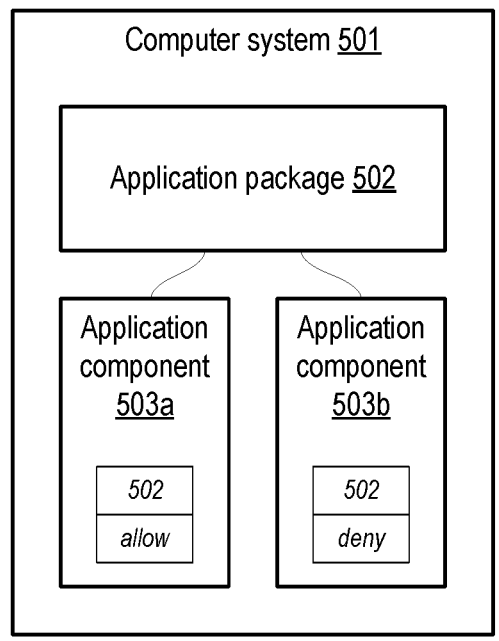
FIG. 5 shows a block diagram for an embodiment of a computer system, including a respective installed application package.

Turning now to FIG. 5, a block diagram for another computer system is illustrated. Computer system 501 includes installed application package, 502. Application components 503a and 503b are specified by application package 502.

In the illustrated embodiment, computer system 501 corresponds to an Internet-connected system of one or more server computers capable of hosting server-based application workspaces for multiple tenants. In other embodiments, however, computer system 501 may correspond to any suitable type of computer system. A subscriber to services hosted by computer system 501 may install application package 502. In some embodiments, installation of application package 502 may include storage of program instructions, data, and metadata related to application package 502 onto a computer system local to the subscriber. In the illustrated embodiment, the installation process may include storage of program instructions, data, and metadata related to application package 502 into an application workspace allocated to the subscriber and maintained as a part of computer system 501.

Application package 502, in the illustrated embodiment, corresponds to one or more files that include program instructions, data, or metadata associated with an application. Application package 502, may in some embodiments, correspond to application packages 102 and 112 in FIG. 1, and therefore, may also include code and files as described above. In some embodiments, a developer can precisely define a metadata package which includes all setup data that make up an application. As shown, application package 502 includes two application components, 503a and 503b. Application components 503a and 503b are installed as a part of application package 502.

As part of the installation of application package 502, computer system 501, as shown in the illustrated embodiment, installs application component 503a and application component 503b into a subscriber's server-based application workspace. Computer system 501 stores two values into each of application components 503a and 503b, a package identifier and a permission value. The package identifier value for each component indicates that both application components 503a and 503b are installed as part of application package 502. The permission value for application component 503a indicates that the application component 503a is accessible, during runtime, by other application packages. In contrast, the permission value for application component 503b indicates that the application component 503b is not accessible, during runtime, by other application packages. In the illustrated embodiment, these permission values may be annotated to their respective application component 503a or 503b. In other embodiments, however, the permission values may be stored in other ways, such as, for example, in a single metadata item for all application components in application package 502.

It is noted that the system of FIG. 5 is merely one example. In other embodiments, the computer system may include additional application packages. In some embodiments, a different number of application components may be specified by each application package.

Figure 6:
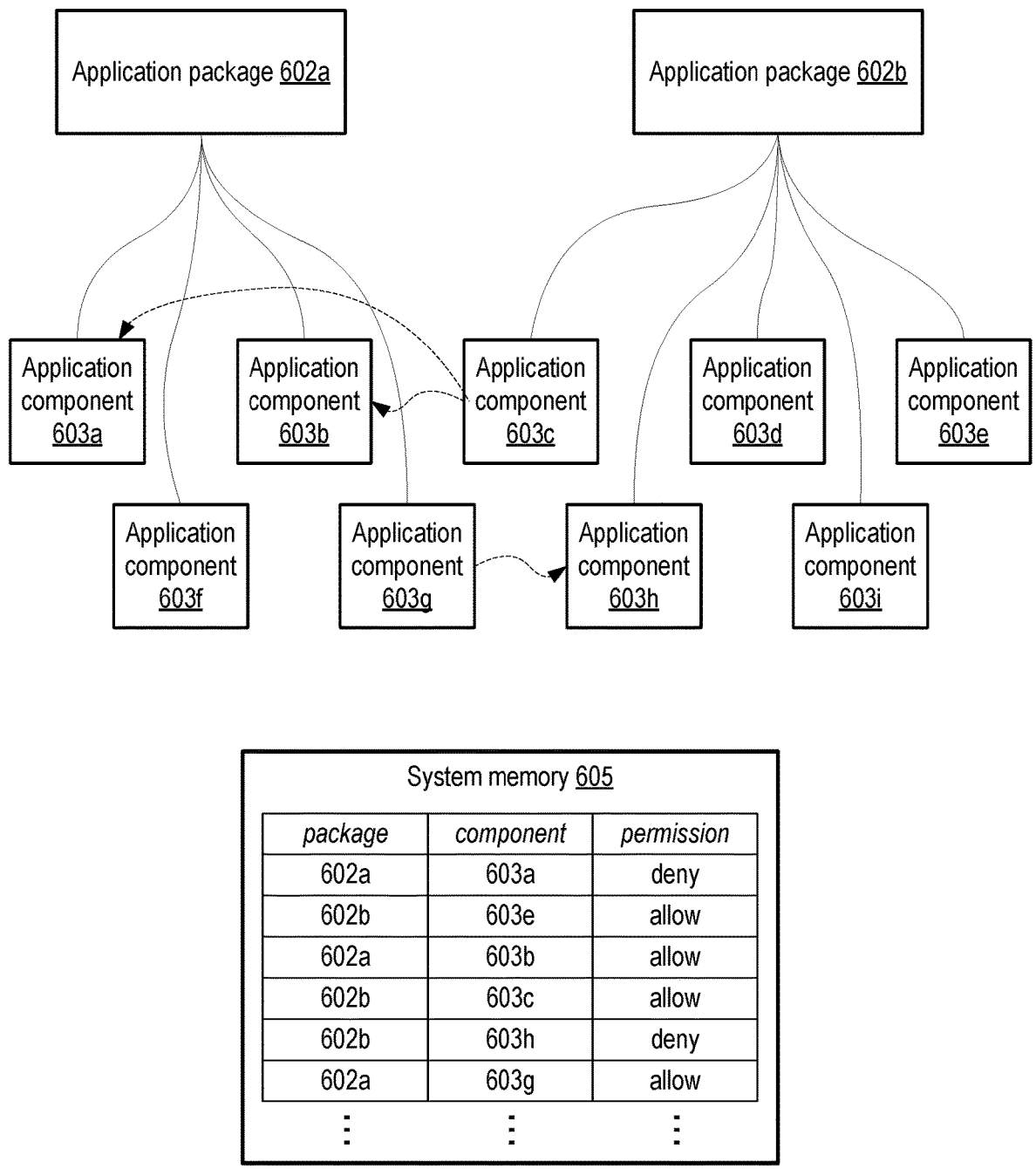
FIG. 6 depicts a block diagram of an embodiment of a system with two active application packages along with a table indicating permission values for application components for each application package.

Proceeding to FIG. 6, two application packages are illustrated, along with a table that identifies permissions of various application components. Application packages 602a and 602b may be installed on a server-based application workspace on a computer system, such as, for example, computer system 501 in FIG. 5. Application package 602a utilizes application components 603a, 603b, 603f, and 603g. Application package 602b utilizes application components 603c-603e, 603h and 603i. System memory 605, in the illustrated embodiment, corresponds to system memory of computer system 501 that is allocated to the application workspace.

Application packages 602a and 602b may both be executing in the application workspace. During execution of each application package, various application components may be processed. Processing of an application package may include reading and/or writing of data or metadata, as well as execution of one or more program instructions that may be included in some components. In the illustrated embodiment, as an application component is processed, information associated with the application component is read and stored in system memory 605. As shown in FIG. 6, application components 603a, 603e, 603b, 603c, 603h and 603g have been processed and three pieces of information have been stored for each component: a package identifier indicating with which application package the application component was installed, an identifier for the application component being processed, and a permission value indicating if the respective application component is accessible, during runtime, by components installed with other application packages.

As an example, application component 603c of application package 602b, may attempt to access application component 603b of application package 602a. In some embodiments, accesses may include read and write requests. In the illustrated embodiment, accesses of application components are limited to read accesses. Application component 603c may attempt to read a data value stored in application component 602b. In response to the attempt to access application component 603b, computer system 501 scans the information stored in system memory 605 for an entry corresponding to application component 603b, and reads the corresponding permission value. In the current embodiment, permission values correspond to either "allow" or "deny." In other embodiments, however, any suitable value and/or number of values may be used. For application component 603b, a permission value corresponding to "allow" is read. Application component 603c, therefore, may be permitted to access application component 603b.

Similarly, application component 603g, of application package 602a, may attempt to read a data value stored in application component 603h, of application package 602b. In response to the access attempt, computer system 501 again scans the information stored in system memory 605 for an entry corresponding to application component 603h, and reads the corresponding permission value. In this example, the permission value corresponds to "deny" and application component 603g is blocked from accessing application component 603h. It is noted, however, that an access to application component 603h by another application component of application package 602b, such as, e.g., application component 603c, may be allowed despite the permission value of "deny."

It is also noted that the block diagram of FIG. 6 is an example for demonstrating disclosed concepts. Only functional blocks necessary to illustrate the concepts are shown for clarity. In other embodiments, any suitable number of application packages and corresponding components may be included.

Figure 7:
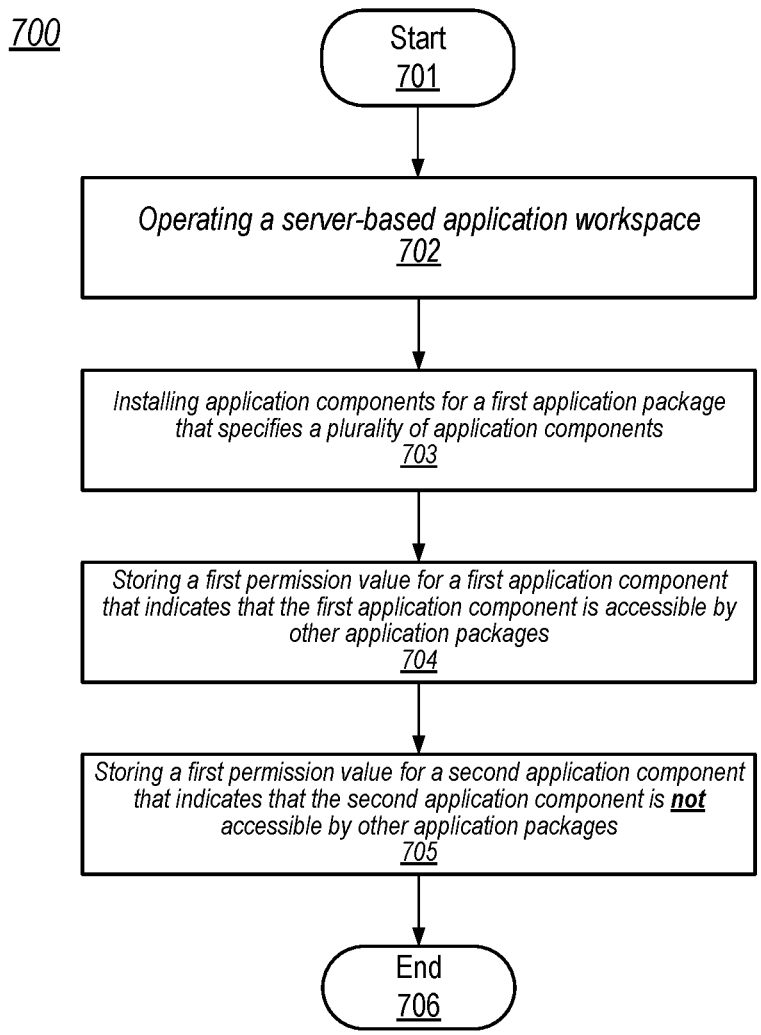
FIG. 7 shows a flow diagram of an embodiment of a method for installing an application package and applying permission values for accessing application components of the package.

Moving to FIG. 7, a flow diagram of an embodiment of a method for installing an application package, including permission values for corresponding application components, is depicted. Method 700 may be performed by a computer system, such as, for example, computer system 501 in FIG. 5. Referring collectively to FIGS. 5 and 7, method 700 begins in block 701.

A computer system operates a server-based application workspace (block 702). In the illustrated embodiment, computer system 501 corresponds to a system of one or more server computers capable of hosting a server-based application workspace. The application workspace may correspond to a portion of resources, e.g., memory and processor cores, of computer system 501 that are allotted to application package 502 during installation.

The computer system installs application components for a first application package into the server-based application workspace (block 703). In the illustrated embodiment, application package 502 specifies two of application components, application components 503a and 503b. As part of the installation process, computer system 501 annotates each of application components 503a and 503b with additional information.

The computer system stores a first permission value for a first application component of the plurality of application components that indicates that the first application component is accessible, during runtime, by other application packages (block 704). Computer system 501, during the installation process, annotates application component 503a with a package identifier of "502" that indicates the application package with which application component 503a is installed, i.e., application package 502. In addition, computer system 501 also annotates application component 503a with a permission value corresponding to "allow," thereby indicating that application component 503a may be accessed by components from other application packages.

The computer system stores a second permission value for a second application component of the plurality of application components that indicates that the second application component is not accessible, during runtime, by other application packages (block 705). Similar to block 704, computer system 501 annotates application component 503b with a value of "502" to indicate that it is installed with application package 502. Furthermore, computer system 501 annotates a permission value corresponding to "deny," thereby indicating that application component 503b is not accessible by components from other application packages. The method ends in block 706.

It is noted that the method of FIG. 7 is an example embodiment. In other embodiments, a different number of operations may be included. Although operations are illustrated as occurring in series, they may be performed in a different order, including in parallel. For example, operations in blocks 704 and 705 may occur in parallel in some embodiments.

Figure 8:
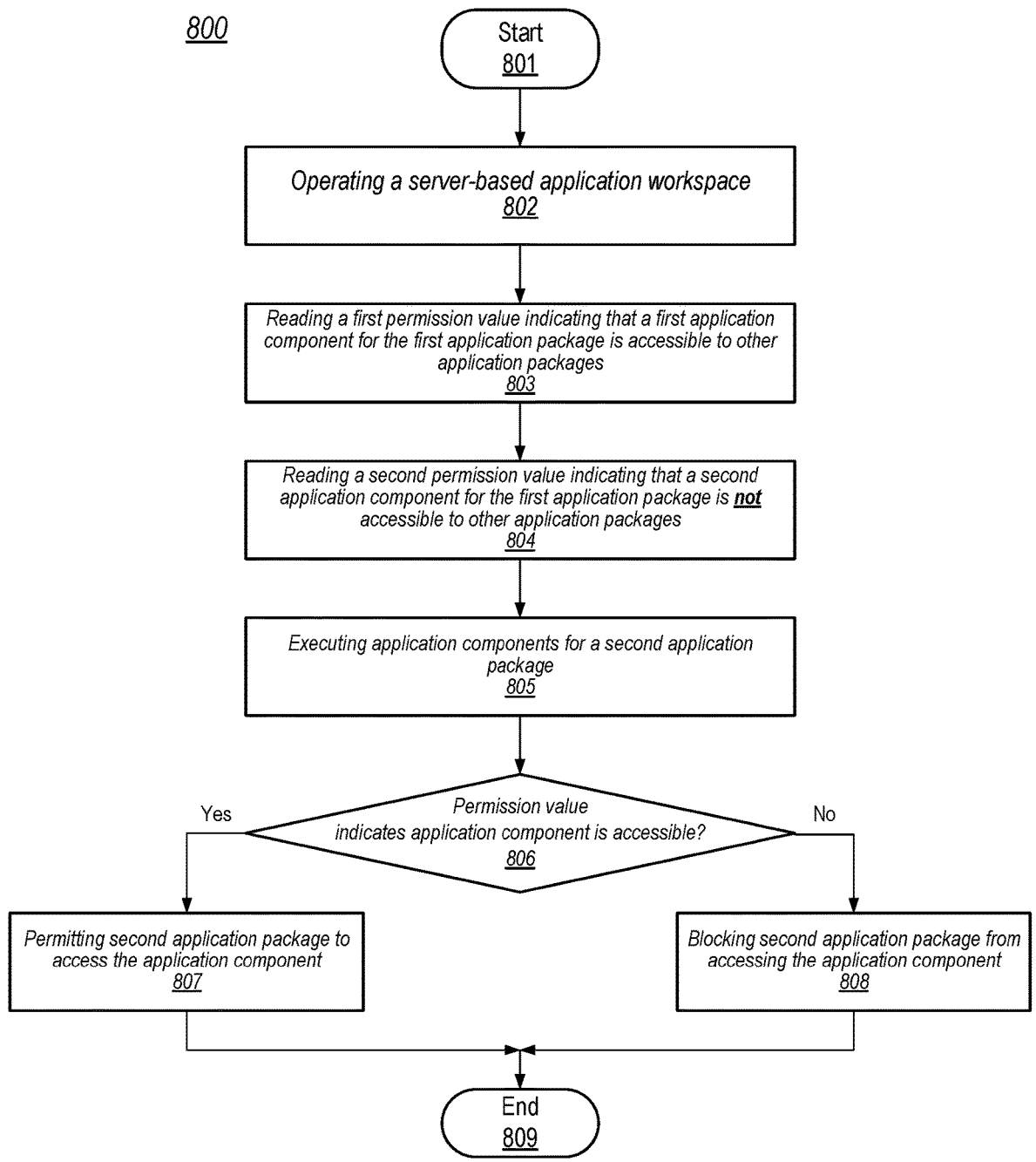
FIG. 8 is a flow diagram illustrating an embodiment of a method for reading and applying permission values of application components during runtime.

Turning to FIG. 8, a flow diagram of an embodiment of a method for enforcing a permission technique on application components of an application package, is shown. Method 800 may be performed by a computer system, such as, for example, computer system 501 in FIG. 5, with two or more application packages installed, for example, application packages 602a and 602b in FIG. 6. Referring collectively to FIGS. 5, 6, and 8, method 800 begins in block 801.

A computer system operates a server-based application workspace (block 802). Similar to the previous descriptions, computer system 501 may correspond to a system of one or more server computers capable of hosting a server-based application workspace. The application workspace may correspond to a portion of resources of computer system 501 that are allotted to application packages 602a and 602b during execution of the packages.

The computer system reads a first permission value specified during installation of a first application package (block 803). In the illustrated embodiment, computer system 501 reads information, including the first permission value, from application component 603b of application package 602a. The permission value for application component 603b, i.e., "allow," indicates that it is accessible to other application packages during runtime. The read information is stored into an entry in system memory 605 by computer system 501.

The computer system reads a second permission value specified during installation of the first application package (block 804). Computer system 501 reads information from application component 603a, including the second permission value corresponding to "deny." This second permission value indicates that application component 603a is not accessible to other application packages during runtime. Again, computer system 501 stores the read information, including the second permission value, to another entry in system memory 605.

In the server-based application workspace, the computer system executes application components for a second application package (block 805). Computer system 501, in the illustrated embodiment, executes application components specified by application package 602b, including application component 603c. During execution of application component 603c, access requests are made to application components 603b and 603a of application package 602a.

Further operations of method 800 may depend on a permission value for an application component (block 806). Upon receiving the requests to access each of application components 603b and 603a by application component 603c, computer system 501 retrieves the previously stored permission values corresponding to each component. If the retrieved permission value indicates that access is allowed, then the method moves to block 807 to permit the access request. Otherwise, if the retrieved permission value indicates that access by other packages is denied, then the method moves to block 808 to block the access request.

Based on the first permission value, the computer system permits access to the first application component of the first application package by the second application package (block 807). Application component 603b has a permission value corresponding to "allow," indicating that application component 603c of application package 602b may be allowed to access data or metadata included in files corresponding to application component 603b. Computer system 501 reads the requested information from application component 603b and sends the information to application component 603c. The method ends in block 809.

Based on the second permission value, the computer system blocks access to the second application component of the first application package by the second application package (block 808). In contrast to application component 603b, application component 603a has a permission value corresponding to "deny," indicating that application component 603c of application package 602b is not allowed to access data or metadata included in files corresponding to application component 603a. Computer system 501 blocks the request and, in some embodiments, sends an indication of the blocked access to application component 603c. The method ends in block 809.

It is noted that method 800 is one embodiment for enforcing a permission technique on application components of an application package. Some operations are illustrated as occurring in series. They may be performed in a different order, in other embodiments, however. In some embodiments, a different number of operations may be included.

Figure 9:
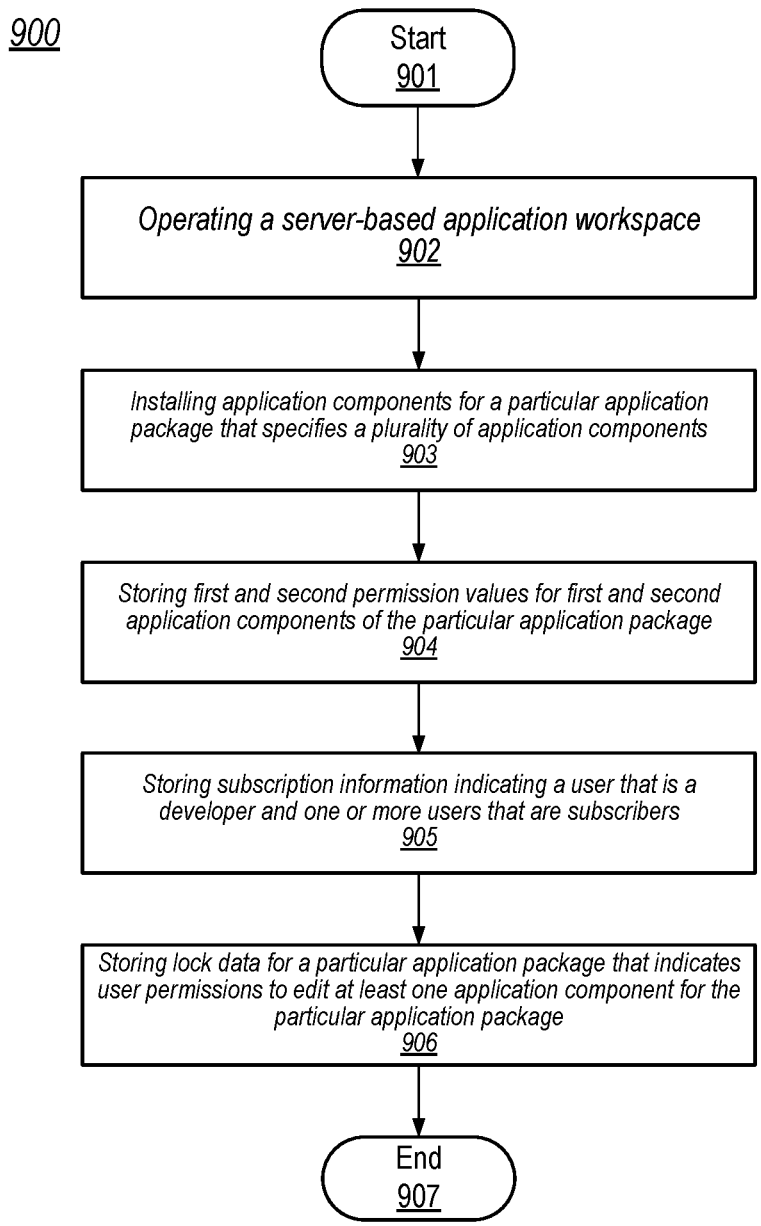
FIG. 9 is a flow diagram depicting an embodiment of a method for installing an application package, including lock data and permission values corresponding to application components of the package.

Various combinations of the previously presented methods may be combined in some embodiments. Proceeding to FIG. 9, a flow diagram of an embodiment of a method for installing an application package, including lock data and permission values, is illustrated. As described for previous methods, method 900 may be performed by a computer system, such as, for example, computer systems 101 and 501 in FIGS. 1 and 5, respectively. Referring collectively to FIGS. 5 and 9, method 900 begins in block 901.

A computer system operates a server-based application workspace (block 902). As previously described, computer system 501 may correspond to a system of one or more server computers capable of hosting a server-based application workspace. The application workspace may correspond to a portion of resources of computer system 501 that are allotted to application package 502 during installation of the package.

The computer system installs a plurality of application components for an application package into the server-based application workspace (block 903). In the illustrated embodiment, computer system 501 installs application components 503a and 503b as part of application package 502. In some embodiments, additional application components (not shown in FIG. 5) may also be installed.

The computer system stores first and second permission values for respective first and second application components of the plurality of application components (block 904). Computer system 501 stores respective permission values into each of application components 503a and 503b. The permission value corresponding to application component 503a indicates that it is accessible by components installed with other application packages. The permission value corresponding to application component 503b, in contrast, indicates that it is not accessible by components from other application packages.

Subscription information is stored by the computer system (block 905). The subscription information identifies a user that is a developer for the particular application package. The subscription information also identifies one or more users that are subscribers for the particular application package. During an installation process of application package 502, computer system 501 identifies a particular user or entity as a developer for the respective packages, while other users of application package 502 may be identified and assigned as subscribers.

Lock data is stored by the computer system for the application package (block 906). Lock data for application package 502 may indicate user permissions for editing at least one application component of the package. A value for the lock data may be selected by the identified developer, or may be predetermined based on respective subscriber contracts submitted upon gaining usage privileges to application packages 502. The method ends in block 907.

It is noted that the method of FIG. 9 is merely an example for combining elements of previously presented methods, such as, e.g., method 300 and method 700 of FIGS. 3 and 7, respectively. Although the operations are illustrated as occurring in series, they may be performed in a different order, in other embodiments. In some embodiments, a different number of operations may be included.

Figure 10:
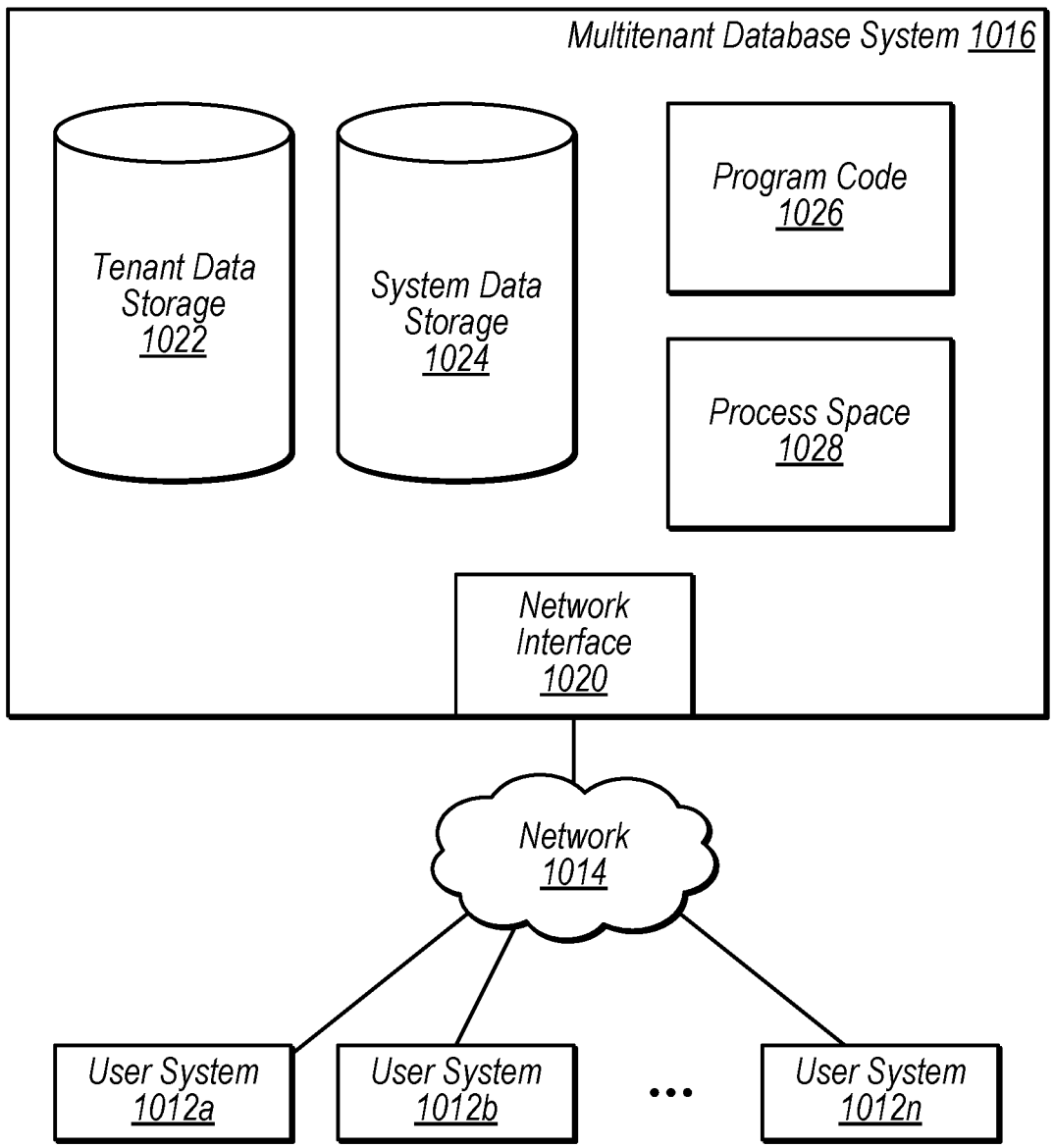
FIG. 10 is a block diagram illustrating an exemplary environment for a multitenant database system, according to some embodiments.

An example of a possible embodiment of a computer system as described herein, such as computer systems 101 and 501 in FIGS. 1 and 5, respectively, is presented below in FIG. 10. The system of FIG. 10 illustrates an exemplary environment in which a multitenant database system might be implemented. Note that the disclosed multitenant system is included for illustrative purposes, but is not intended to limit the scope of the present disclosure. In other embodiments, similar techniques may be implemented in non-multitenant environments such as various client/server environments, cloud computing environments, clustered computers, etc. As illustrated in FIG. 10 one or more user systems 1012 may interact via a network 14 with a multi-tenant database system (MTS) 1016. The users of those user systems 1012 may be users in differing capacities and the capacity of a particular user system 1012 might be determined by the current user. For example, when a salesperson is using a particular user system 1012 to interact with MTS 1016, that user system 1012 may have the capacities allotted to that salesperson. However, while an administrator is using the same user system 1012 to interact with MTS 1016, it has the capacities allotted to that administrator.

Network 1014 may be a LAN (local area network), WAN (wide area network), wireless network, point-to-point network, star network, token ring network, hub network, or any other appropriate configuration. The global internetwork of networks, often referred to as the "Internet" with a capital "I," is used in many of the examples herein and is one example of a TCP/IP (Transfer Control Protocol and Internet Protocol) network. It should be understood, however, that the networks that the disclosed embodiments may utilize any of various other types of networks.

User systems 1012 may communicate with MTS 1016 using TCP/IP and, at a higher network level, use other common Internet protocols to communicate, such as HTTP, FTP, AFS, WAP, etc. As an example, where HTTP is used, user system 1012 might include an HTTP client commonly referred to as a "browser" for sending and receiving HTTP messages from an HTTP server at MTS 1016. Such a server might be implemented as the sole network interface between MTS 1016 and network 1014, but other techniques might be used as well or instead. In some implementations, the interface between MTS 1016 and network 1014 includes load sharing functionality, such as round-robin HTTP request distributors to balance loads and distribute incoming HTTP requests evenly over a plurality of servers. Preferably, each of the plurality of servers has access to the MTS's data, at least for the users that are accessing a server.

In some embodiments, the system shown in FIG. 10 implements a web-based customer relationship management (CRM) system. For example, in some embodiments, MTS 1016 includes application servers configured to implement and execute CRM software applications as well as provide related data, code, forms, web pages and other information to and from user systems 1012 and to store to, and retrieve from, a database system related data, objects and web page content. In embodiments of a multitenant system, tenant data is preferably arranged so that data of one tenant is kept separate from that of other tenants so that that one tenant does not have access to another tenant's data, unless such data is expressly shared.

One arrangement for elements of MTS 1016 is shown in FIG. 10, including a network interface 1020, storage 1022 for tenant data, storage 1024 for system data accessible to MTS 1016 and possibly multiple tenants, program code 1026 for implementing various functions of MTS 1016, and a process space 1028 for executing MTS system processes and tenant-specific processes, such as running applications as part of an application service.

Several elements in the system shown in FIG. 10 may include conventional, well-known elements that need not be explained in detail here. For example, each user system 1012 may be a desktop personal computer, workstation, laptop, PDA, cell phone, or any WAP-enabled device or any other computing device capable of interfacing directly or indirectly to the Internet or other network connection. User system 1012 may execute an HTTP client, e.g., a browsing program, such as Microsoft's Internet Explorer™ or Edge browsers, Mozilla's Firefox™ browser, Google's Chrome™ browser, Opera Software's Opera browser, or a WAP-enabled browser in the case of a cell phone, PDA or other wireless device, or the like, allowing a user (e.g., subscriber of a CRM system) of user system 1012 to access, process, and view information and pages available to it from MTS 1016 over network 1014. Each user system 1012 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 1016 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

In some embodiments, each user system 1012 and its components are operator configurable using applications, such as a browser, that include computer code executable on one or more processing elements. Similarly, in some embodiments, MTS 1016 (and additional instances of MTSs, where more than one is present) and their components are operator configurable using application(s) that include computer code executable on one or more processing elements. Thus, various operations described herein may be performed by executing program instructions stored on a non-transitory computer-readable medium and executed by one or more processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

According to some embodiments, each MTS 1016 is configured to provide web pages, forms, applications, data, and/or media content to user systems 1012 to support the access by user systems 1012 as tenants of MTS 1016. As such, in this embodiment, MTS 1016 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, MTSs may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

Various operations described herein may be implemented by a computing device configured to execute program instructions that specify the operations. Similarly, various operations may be performed by circuitry desired or configured to perform the operations. In some embodiments, a non-transitory computer-readable medium has program instructions stored thereon that are capable of causing various operations described herein. As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   operating, by a computer system, a server-based application workspace;
   storing, by the computer system, subscription information indicating a user that is a developer for a particular application package, and one or more users, different from the developer, that are subscribers for the particular application package;
   storing, by the computer system, lock data for the particular application package that indicates permissions to edit individual ones of a plurality of application components for the particular application package, wherein the lock data specifies a first group of non-subscriber-editable components that includes a first application component, and wherein the lock data specifies a second group of subscriber-editable components that includes a second application component;

based on the lock data:
permitting, by the computer system, the developer to edit all of the plurality of application components of the particular application package; and
denying requests from the subscribers to edit the first application component; and
accepting requests from the subscribers to edit the second application component;

storing, by the computer system, edit information in a database indicating differences in the second application component before and after the subscriber edits;

detecting, by the computer system, a conflict between a particular subscriber edit and a particular developer edit to the second application component;

providing, by the computer system, the edit information and conflict details to the developer; and in response to the detecting, resolving, by the computer system, the conflict.

2. The method of claim 1, wherein the lock data applies to all application components for the particular application package.

3. The method of claim 1, wherein the lock data further specifies a third group of subscriber-readable components that includes a third application component of the particular application package, and further comprising based on the lock data:
allowing requests from the subscribers to read the third application component; and
denying requests from the subscribers to write to the third application component.

4. The method of claim 1, wherein the lock data is specified by the developer at a release of the particular application package to the server-based application workspace.

5. The method of claim 1, wherein providing the edit information to the developer includes sending, by the computer system, information associated with edits to the developer in response to a release of the edited second application component to the application workspace.

6. The method of claim 1, wherein providing the edit information to the developer includes operating, by the computer system, a background process in the application workspace that periodically scans installed application components to identify new edits.

7. The method of claim 1, further comprising:
overwriting, by the computer system, any subscriber edits to the second application component during a subsequent developer upgrade of the particular application package.

8. The method of claim 1, wherein resolving the conflict includes overwriting, by the computer system, the particular subscriber edit with the particular developer edit.

9. A method, comprising:
operating, by a computer system, a server-based application workspace;
installing, by the computer system, application components for a particular application package into the server-based application workspace, wherein the particular application package specifies a plurality of application components;

storing, by the computer system, first and second permission values for respective first and second application components of the plurality of application components that indicate that the first application component is accessible by other application packages and that the second application component is not accessible by other application packages;

storing, by the computer system, subscription information indicating a user that is a developer for the particular application package, and one or more users, different from the developer, that are subscribers for the particular application package;

storing, by the computer system, lock data for the particular application package that indicates permissions to edit individual ones of a plurality of application components for the particular application package, wherein the permissions for a given user are based upon whether the subscription information indicates that the given user is a developer or a subscriber;

allowing a user identified as a subscriber to edit a particular application component;

storing, by the computer system, edit information in a database indicating differences in the particular application component before and after the subscriber edits to the particular application component;

detecting, by the computer system, a conflict between the subscriber edit and a developer edit to the particular application component;

providing, by the computer system, the edit information and conflict details to the developer; and in response to the detecting, resolving, by the computer system, the conflict.

10. The method of claim 9, wherein the lock data applies to all application components for the particular application package.

11. The method of claim 9, wherein providing the edit information to the developer includes sending, by the computer system, information associated with edits to the developer in response to a release of the edited particular application component to the application workspace.

12. The method of claim 9, further comprising executing, by the computer system in the server-based application workspace, application components for a different application package, wherein the executing includes an attempted access to the first application component of the particular application package by an application component of the different application package;
permitting, by the computer system, access to the first application component of the particular application package by the different application package, wherein the permitting is based on the first permission value; and
blocking, by the computer system, access to the second application component of the particular application package by the different application package, wherein the permitting is based on the second permission value.

13. The method of claim 12, wherein second lock data for the different application package indicates that all application components of the different application package are editable by subscribers to the different application package.

14. A non-transitory computer-readable medium having instructions stored thereon that are executable by a computer system to perform operations comprising:
operating a server-based application workspace;
identifying a user that is a developer for a particular application package, and a set of users that are subscribers for the particular application package;

storing lock data for the particular application package, wherein the lock data indicates respective permissions for developers and subscribers that are different from the developer to edit at least a first and a second application component of a plurality of application components specified by the particular application package; and based on the lock data:
- permitting the developer to edit all of the application components of the particular application package; and
- denying requests from the subscribers to edit the first application component; and
- accepting requests from the subscribers to edit the second application component;

storing edit information in a database indicating differences in the second application component before and after the subscriber edits;

detecting, by the computer system, a conflict between a particular subscriber edit and a particular developer edit to the second application component;

providing the edit information to the developer; and in response to the detecting, resolving the conflict.

15. The non-transitory computer-readable medium of claim 14, wherein providing the edit information to the developer includes sending information associated with edits to the developer in response to a release of the edited second application component to the application workspace.

16. The non-transitory computer-readable medium of claim 14, wherein the lock data is specified by the developer at a release of the particular application package to the server-based application workspace.

17. The non-transitory computer-readable medium of claim 14, wherein providing the edit information to the developer includes operating a background process in the application workspace that periodically scans installed application components to identify new edits.

18. The non-transitory computer-readable medium of claim 14, further comprising:
overwriting any subscriber edits to the second application component during a subsequent developer upgrade of the particular application package.

19. The non-transitory computer-readable medium of claim 14, wherein resolving the conflict includes overwriting the particular subscriber edit with the particular developer edit.

20. The non-transitory computer-readable medium of claim 14, further comprising storing respective first and second permission values for the first and second application components of the plurality of application components, wherein the first and second permission values indicate that the first application component is accessible by other application packages and that the second application component is not accessible by other application packages.

* * * * *